(12) United States Patent
Bartelmuss

(10) Patent No.: US 9,982,389 B2
(45) Date of Patent: May 29, 2018

(54) TEARING STRIP OF PAPER FOR SEVERING A PAPER WEB

(71) Applicant: Klaus Bartelmuss, Teufenbach (AT)

(72) Inventor: Klaus Bartelmuss, Teufenbach (AT)

( * ) Notice: Subject to any disclaimer, the term of this patent is extended or adjusted under 35 U.S.C. 154(b) by 84 days.

(21) Appl. No.: 15/298,283

(22) Filed: Oct. 20, 2016

(65) Prior Publication Data

US 2017/0114500 A1 Apr. 27, 2017

(30) Foreign Application Priority Data

Oct. 22, 2015 (AT) .................................. A 690/2015

(51) Int. Cl.
*B32B 3/26* (2006.01)
*D21F 7/00* (2006.01)
*B32B 3/04* (2006.01)
*B32B 7/12* (2006.01)

(52) U.S. Cl.
CPC ................ *D21F 7/006* (2013.01); *B32B 3/04* (2013.01); *B32B 7/12* (2013.01)

(58) Field of Classification Search
CPC ..... Y10T 428/24612; Y10T 428/24231; Y10T 428/24264; B26D 1/5475
See application file for complete search history.

(56) References Cited

U.S. PATENT DOCUMENTS

| 4,414,258 A | 11/1983 | Corbin, Sr. |
| 7,794,816 B2 | 9/2010 | Rodriguez |
| 9,340,928 B2 | 5/2016 | Bartelmuss |
| 2003/0235687 A1 | 12/2003 | Peacock |
| 2006/0275580 A1 | 12/2006 | Rodriguez |

FOREIGN PATENT DOCUMENTS

| EP | 2868605 A1 | 5/2015 |
| JP | 2004106324 | 4/2004 |
| WO | 03101872 A1 | 12/2003 |
| WO | 2004026743 A1 | 4/2004 |

*Primary Examiner* — Alexander Thomas
(74) *Attorney, Agent, or Firm* — Laurence A. Greenberg; Werner H. Stemer; Ralph E. Locher

(57) ABSTRACT

A paperband tearing strip for severing a paper web that moves from a papermaking plant onto a winding drum. The tearing strip is composed of a paper strip which has two longitudinally running lateral folds along which the paper strip is folded on top of itself. The central strip part in relation to the lateral strip parts has a thickness which is at least 1.5 times greater, and the width of said central strip part is at least one fifth of the width of the paper strip. The widths of the lateral strip parts each are at least one tenth of the width of the central strip part. The central strip part is formed with at least one fold on account of which the central strip part is configured to be at least quadruple-layered.

6 Claims, 3 Drawing Sheets

TEARING STRIP OF PAPER FOR SEVERING A PAPER WEB

CROSS-REFERENCE TO RELATED APPLICATION

This application claims the priority, under 35 U.S.C. § 119, of Austrian patent application AT A 690/2015, filed Oct. 22, 2015; the prior application is herewith incorporated by reference in its entirety.

BACKGROUND OF THE INVENTION

Field of the Invention

The present invention relates to a tearing strip which is composed of paper, for severing a paper web which moves from a plant for producing paper and which is wound onto drums, so as to hereby enable winding of the paper web onto an empty drum. The tearing strip is composed of a paper strip which is configured having two longitudinally running lateral folds along which the paper strip is folded on top of itself, and wherein the central strip part in relation to the lateral strip parts has a thickness which is at least 1.5 times greater, and the width of the central strip part is at least one fifth of the width of the paper strip, and furthermore the widths of the lateral strip parts each are at least one tenth of the width of the central strip part.

A tearing strip is known from my earlier patent No. U.S. Pat. No. 9,340,928 B2 and its counterpart European published patent application EP 2 868 605 A1. That tearing strip has two lateral strip parts by means of which the tearing strip is guided in a guide duct from one side of that paper web that is to be severed to the other side. Furthermore, the tearing strip has a central strip part by way of which the tearing function is fulfilled. In order for this tearing strip to be able to be pulled out of the guide duct, the two lateral strip parts in relation to the central strip part are configured having a substantially lesser thickness. On account thereof, this tearing strip is sufficiently elastic in order for it to be able to be pulled out of the guide duct without damage. The central strip part is provided with inserts or overlays which are composed of paper strings, a plurality of layers of paper strips, or paper strips having a great thickness.

Reference is made to the description in the above-mentioned patent U.S. Pat. No. 9,340,928 B2 and EP 2 868 605 A1 with regard to the mode of functioning of this tearing strip.

By way of a tearing strip of this type, the requirements set in terms of elasticity of the lateral regions, on the one hand, so as to avoid damage by pulling out the tearing strip from the guide duct, and in terms of high tear resistance, on the other hand, are fully met. However, one disadvantage of this known tearing strip lies in that the paper strings are capable of being dissolved only with difficulty when the remnants of the paper web in which the tearing strip is located and which are created in the severing procedure of paper webs are being recycled. A further disadvantage lies in that during manufacturing of this tearing strip the overlays or inserts, respectively, which are located in the central region thereof have to be applied onto a paper strip, to be retained in a central position, and to be fastened to the paper strip, on account of which very great complexity is caused in manufacturing.

A tearing strip which is configured having two longitudinally running lateral folds along which the tearing strip is folded on top of itself is furthermore known from U.S. Pat. No. 7,794,816 B2, wherein the central strip part in relation to the lateral strip parts has a thickness which is approximately 1.5 times greater, and the width of the central strip part is approximately three fifths the width of the width of the tearing strip, and the widths of the lateral strip parts in each case is approximately one fifth the width of the tearing strip.

Since the edges in the case of this tearing strip are formed by folds, the edge-tear strength is substantially enhanced in relation to a cut paper edge. However, this tearing strip in the central region thereof is configured to be only triple-layered, on account of which the tearing strip has insufficient tensile strength for the severing procedure. For this reason, there is a requirement for the tearing strip to be manufactured from a comparatively thick paper strip. However, in the case of a thick paper strip the lateral strip parts are insufficiently elastic in order to exclude damage when the tearing strip is pulled out of the guide duct. Moreover, by virtue of the cut edges, the central strip part has only minor edge-tear strength.

BRIEF SUMMARY OF THE INVENTION

It is accordingly an object of the invention to provide a paperband tear strip which overcomes the above-mentioned and other disadvantages of the heretofore-known devices and methods of this general type.

With the foregoing and other objects in view there is provided, in accordance with the invention, a tearing strip which is composed of paper, for severing a paper web the moves from a papermaking plant and which is wound onto drums, for severing the paper web and to enable winding of the paper web onto an empty drum. The novel tearing strip comprises:

an elongated paper strip formed with two longitudinally running lateral folds along which the paper strip is folded on top of itself, defining a central strip part and lateral strip parts;

the central strip part having a thickness at least 1.5 times greater than the lateral strip parts and the central strip part having a width at least one fifth of a width of the paper strip;

each of the lateral strip parts having a width at least one tenth of the width of the central strip part; and the central strip part having at least one fold on account of which the central strip part is at least quadruple-layered with at least four layers.

In other words, the objects of the invention are achieved in that moreover the central strip part is configured at least having one fold on account of which the central strip part is configured at least so as to be quadruple-layered.

Preferably, the central strip part is configured having at least two longitudinally running folds along which the paper strip is once again folded, on account of which the tearing strip in the central region thereof at least is quintuple-layered.

According to one further preferred embodiment, the central strip part is configured having three further longitudinally running folds along which the paper strip is once again folded, on account of which the tearing strip in the central region thereof at least is sextuple-layered.

Preferably, in the case of a tearing strip according to the invention, the strip parts which are folded on top of one another of said tearing strip are partially or entirely adhesively bonded to one another. According to one further preferred feature, a tearing strip according to the invention is manufactured from a kraft paper.

Other features which are considered as characteristic for the invention are set forth in the appended claims.

Although the invention is illustrated and described herein as embodied in a tearing strip of paper for severing a paper web, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
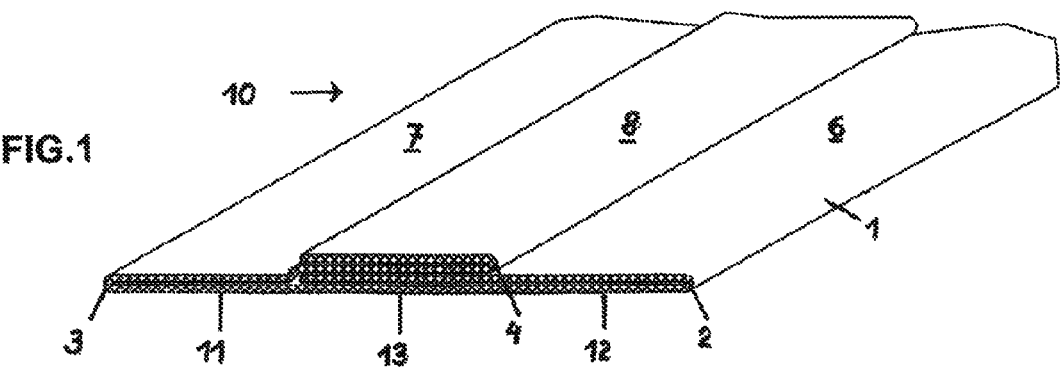
FIG. 1 is an axonometric (perspective) view of an exemplary embodiment of a tearing strip according to the invention.

Referring now to the figures of the drawing in detail and first, particularly, to FIG. 1 thereof, there is shown a tearing strip 10 which is manufactured from a paper strip 1 and which is configured having two longitudinally running folds 2 and 3 along which said paper strip is folded on top of itself. A region 6 of the paper strip 1 extends from the fold 2 across the central region 13 of the tearing strip 10. A region 7 of the paper strip 1 likewise extends from the fold 3 across the central region 13 of the tearing strip 10, wherein an overlap of the two peripheral regions 6 and 7 is performed in the central region. The region 7 is configured having a further fold 4 along which a lateral region 8 of the paper strip 1 is again folded over. The two lateral regions 11 and 12 of the tearing strip 10 are double-layered, the central region 13 of the tearing strip 10 being quadruple-layered. The widths of the lateral regions 11 and 12, and of the central region 13 of the tearing strip 10 are in each case approximately one third of the width of said tearing strip 10.

Figure 2:
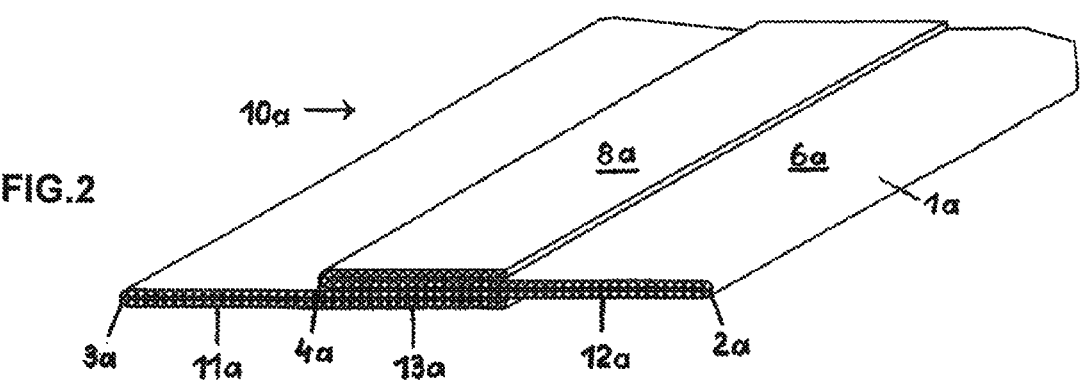
FIGS. 2 to 8 show seven further exemplary embodiments of the tearing strip according to the invention, in each case in an axonometric illustration.

A tearing strip 10a which is manufactured from a paper strip 1a and which likewise is configured having two longitudinally running folds 2a and 3a is illustrated in FIG. 2, wherein the external regions are each folded over onto one of the two sides of the tearing strip 10a. That region 11a of the paper strip 1a that is located laterally outside the fold 3a extends into the central region 13a of the tearing strip 10a. That region 6a that is located laterally outside the fold 2a and that is likewise folded over likewise extends into the central region 13a of the tearing strip 10a, and is configured having a further fold 4a along which said region 6a is folded over. On account thereof, a peripheral region 8a of the paper strip 1a is located in the central region 13a of the tearing strip 10a.

The lateral regions 11a and 12a of the tearing strip 10a are double-layered, and the central region 13a of said tearing strip 10a is quadruple-layered. The widths of the lateral regions 11a and 12a, and of the central region 13a of the tearing strip 10a each are approximately one third of the width of said tearing strip 10a.

Figure 3:
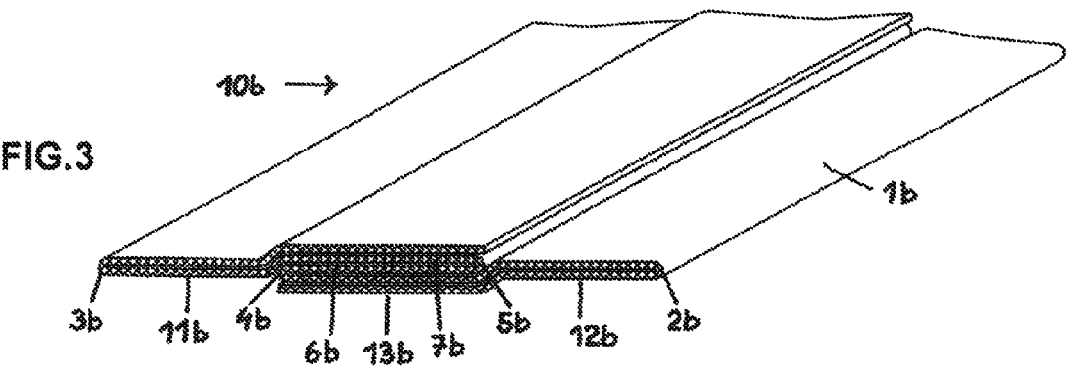

A tearing strip 10b which is manufactured from a paper strip 1b which is provided with two longitudinally running folds 2b and 3b along which the lateral regions of the paper strip 1b are folded over onto the lower side and onto the upper side of the tearing strip 10b is illustrated in FIG. 3. On account thereof, the two lateral regions 11b and 12b of the tearing strip 1b are double-layered.

Two further longitudinally running folds 4b and 5b along which the paper strip 1b is once again folded over are provided in the central region 13b of the tearing strip 10b, on account of which two regions 6b and 7b which are located in the central region 13b of the tearing strip 10b are formed. Thus, three further layers are located in the central region 13b of the tearing strip 10b, on account of which said tearing strip 10b in the central region 13b thereof is quintuple-layered.

The widths of the lateral regions 11b and 12b, and of the central region 13b of the tearing strip 10b each are approximately one third of the width of said tearing strip 10b.

Figure 4:
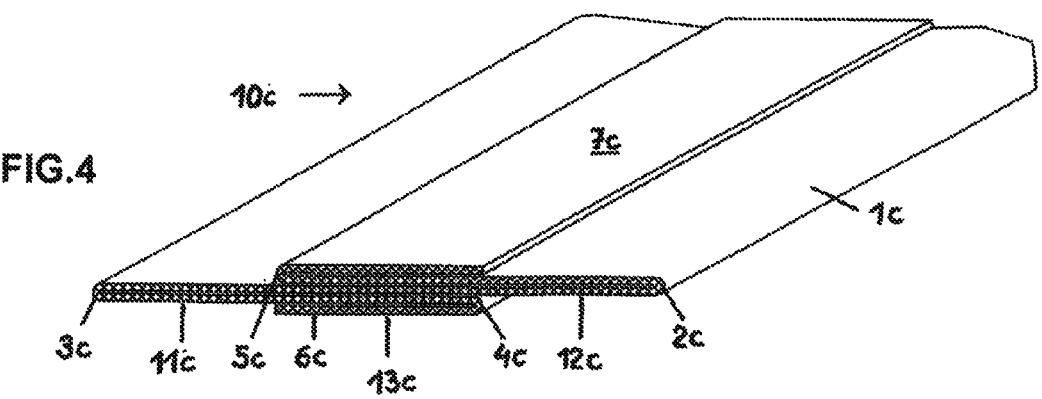

A tearing strip 10c which is manufactured from a paper strip 1c which likewise is configured having two longitudinally running folds 2c and 3c along which said paper strip 1c is folded over onto both sides of the tearing strip 10c is illustrated in FIG. 4. Herein, the two lateral regions 11c and 12c of the tearing strip 10c are double-layered. Moreover, said tearing strip 10c is configured having two further longitudinally running folds 4c and 5c along which each of the two lateral regions of the paper strip 1c are folded over, on account of which regions 6c and 7c which are located in the central region 13c of the tearing strip 10c are formed. On account thereof, the central region 13c of the tearing strip 10c is quintuple-layered.

The widths of the lateral regions 11c and 12c, and of the central region 13c of the tearing strip 10c are each approximately one third of the width of said tearing strip 10c.

Figure 5:
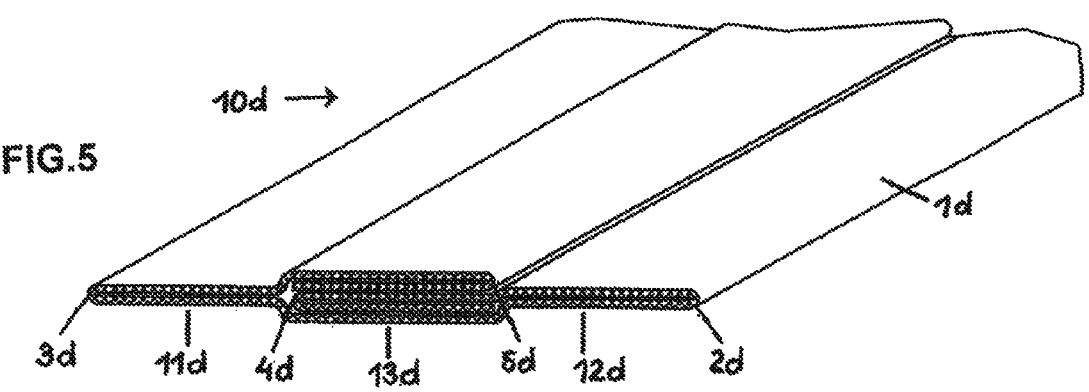

A tearing strip 10d which is manufactured from a paper strip 1d which is configured having two longitudinally running folds 2d and 3d along which said paper strip 1d is folded over is illustrated in FIG. 5. Herein, the two lateral regions 11d and 12d of the tearing strip 1d are double-layered. In the lateral regions thereof, the paper strip 1d is configured having two further folds 4d and 5d along which said paper strip 1d is likewise folded over. On account thereof, the central region 13d of the tearing strip 1d is quintuple-layered.

The widths of the lateral regions 11d and 12d, and of the central region 13d of the tearing strip 10d are each approximately one third of the width of said tearing strip 10d.

Figure 6:
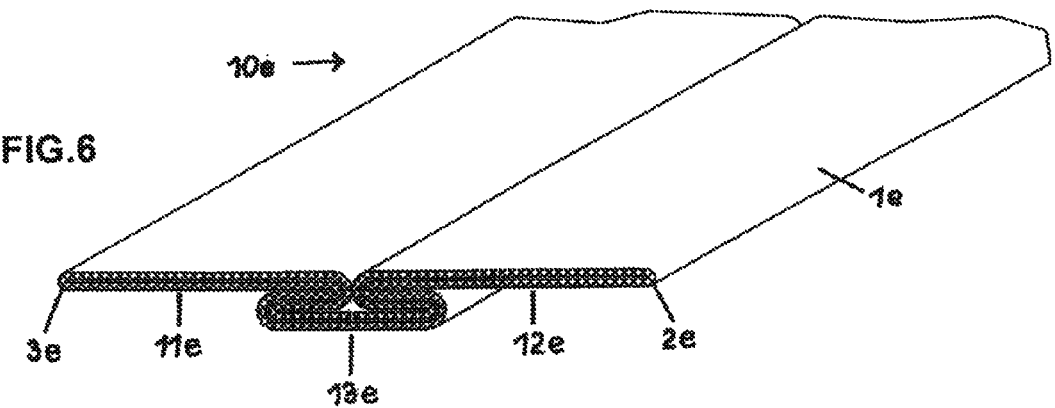

A tearing strip 10e which is manufactured from a paper strip 1e which is likewise configured having two longitudinally running folds 2e and 3e is illustrated in FIG. 6, on account of which the lateral regions 11e and 12e of the tearing strip 10e are double-layered. The central region 13e of the tearing strip 10e is configured having a plurality of longitudinally running folds along which said tearing strip 10e is folded on top of itself multiple times. On account thereof, the central region 13e of the tearing strip 10e is sextuple-layered.

The widths of the lateral regions 11e and 12e, and of the central region 13e of the tearing strip 10e are each approximately one third of the width of said tearing strip 10e.

Figure 7:
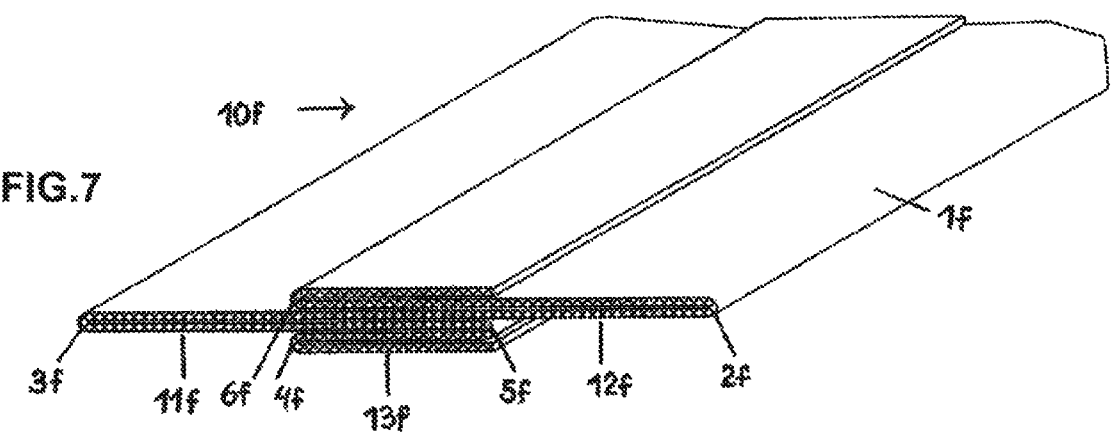

A tearing strip 10f which is manufactured from a paper strip 1f which is likewise configured having two longitudinally running folds 2f and 3f along which said paper strip 1f is folded over is illustrated in FIG. 7. Herein, the lateral regions 11f and 12f of the tearing strip 10f are double-layered. Moreover, the tearing strip 10f is configured having longitudinally running folds 4f, 5f, and 6f, along each of which said tearing strip 10 is folded over, on account of which the tearing strip 10f in the central region 13f thereof is sextuple-layered.

The widths of the lateral regions 11f and 12f, and of the central region 13f of the tearing strip 10f are each approximately one third of the width of said tearing strip 10f.

Figure 8:
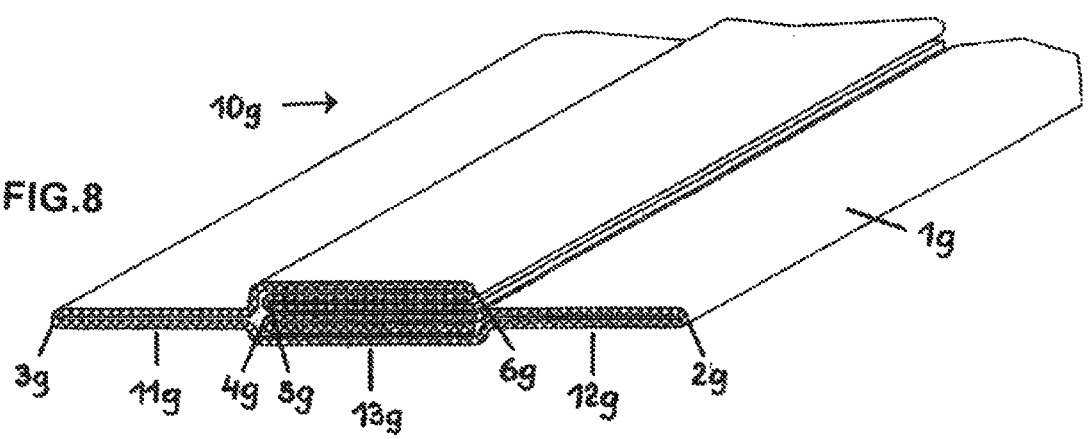

A tearing strip 10g which is manufactured from a paper strip 1g which is configured having longitudinally running folds 2g and 3g along which said paper strip 1g is folded over is illustrated in FIG. 8. Herein, the tearing strip 10g in the two lateral regions 11g and 12g is double-layered. Moreover, the paper strip 1g is configured having further folds 4g, 5g, and 6g, along which said paper strip 1g is folded over, on account of which the tearing strip 10g in the central region 13g thereof is sextuple-layered.

The widths of the lateral regions 11g and 12g, and of the central region 13g of the tearing strip 10g are each approximately one third of the width of said tearing strip 10g.

In relation to the embodiments of FIGS. 1 and 2, the embodiments of FIGS. 3 to 8 are advantageous because the latter in the central regions 13b, 13c, 14d, 13e, 13f, 13g of the tearing strip 10b, 10c, 10d, 10e, 10f, 10g are configured having folds along both peripheries on the upper side and on the lower side, respectively, of the tearing strip, on account of which a high edge-tear strength is guaranteed in the central regions.

It is relevant for a tearing strip according to the invention that the former is composed of a single paper strip which is configured having at least three longitudinally running folds along which said paper strip is folded on top of itself such that said paper strip has two lateral regions and one central region, wherein the lateral regions are of lesser thickness than the central region, or wherein the central region in relation to the two lateral regions has a thickness which is at least 1.5 times greater, respectively. The lateral regions of the tearing strip are double-layered, and the central region is at least quadruple-layered.

The lateral regions each have a width of one tenth to one third of the width of the tearing strip. The central region of the tearing strip has a width of eight tenths to one third of the width of the tearing strip. Preferably, the widths of the lateral regions and of the central region of the tearing strip are each approximately one third of the width of said tearing strip. Since the lateral edges as well as the central region of the tearing strip are configured having folds, this tearing strip, both on the lateral edges as well as in the central region, has a high edge-tear strength. On account of the central region at least being quadruple-layered, this tearing strip moreover has a very high tensile strength.

The individual layers may be partially or entirely adhesively bonded (i.e., glued) to one another. In particular, the layers which are located in the central region of the tearing strip may be adhesively bonded to one another. Dispersion adhesives based on polyvinyl acetate (PVA) may be used as adhesives.

Papers of maximum strength which are referred to as kraft papers or sack papers may be used for manufacturing a tearing strip of this type. The kraft papers having a surface area weight of 70 g/m² to 250 g/m² and a longitudinal elongation of 2% to 15%. Kraft papers are composed almost entirely of cellulose fibers from long-fiber coniferous wood.

In order for a tearing strip of this type to be manufactured, folding over first regions of a paper strip, which are mutually overlapping in the central region of the tearing strip, along longitudinally running folds and subsequent pressing is performed in a first method step. Thereupon, further folding-overs of at least two further regions of the paper strip are performed along at least two further longitudinally running folds.

An adhesive is applied to those regions of the paper strip prior to the folding procedure in which adhesive bonding is to be effected.

The invention claimed is:

1. A tearing strip for severing a paper web in a papermaking plant, the tearing strip comprising:
   an elongated paper strip formed with two longitudinally running lateral folds along which said paper strip is folded on top of itself, defining a central strip part and lateral strip parts;
   said central strip part having a thickness at least 1.5 times greater than said lateral strip parts and said central strip part having a width at least one fifth of a width of said paper strip;
   each of said lateral strip parts having a width at least one tenth of the width of said central strip part; and
   said central strip part having at least one fold and said central strip part is at least quadruple-layered with at least four layers.

2. The tearing strip according to claim 1, wherein said central strip part is formed with at least two longitudinally running folds along which said paper strip is once again folded, on account of which said central region of the tearing strip is at least quintuple-layered with at least five layers.

3. The tearing strip according to claim 2, wherein said central strip part is formed with three further longitudinally running folds along which said paper strip is once again folded, on account of which said central region of the tearing strip is at least sextuple-layered with at least six layers.

4. The tearing strip according to claim 1, wherein parts of the tearing strip that are folded on top of one another are partially or entirely adhesively bonded to one another.

5. The tearing strip according to claim 1, wherein parts of said central strip part that are folded on top of one another are partially or entirely adhesively bonded to one another.

6. The tearing strip according to claim 1, wherein said elongated paper strip forming said tearing strip is manufactured from kraft paper.

* * * * *